United States Patent [19]
Idota et al.

[11] Patent Number: 5,686,203
[45] Date of Patent: Nov. 11, 1997

[54] NON-AQUEOUS SECONDARY BATTERY

[75] Inventors: Yoshio Idota; Shoichiro Yasunami; Mitsutoshi Tanaka, all of Minami-Ashigara, Japan

[73] Assignee: Fuji Photo Film Co., Ltd., Kanagawa, Japan

[21] Appl. No.: 562,223

[22] Filed: Nov. 28, 1995

[30] Foreign Application Priority Data

Dec. 1, 1994 [JP] Japan .................................. 6-298456
Jan. 12, 1995 [JP] Japan .................................. 7-003297

[51] Int. Cl.$^6$ .................................................. H01M 6/14
[52] U.S. Cl. ........................ 429/194; 429/218; 429/232
[58] Field of Search .................................. 429/194, 218, 429/232

[56] References Cited

U.S. PATENT DOCUMENTS

| | | | |
|---|---|---|---|
| 4,271,242 | 6/1981 | Toyoguchi et al. | 429/194 |
| 4,725,422 | 2/1988 | Miyabayashi et al. | 423/445 |
| 5,451,477 | 9/1995 | Omaru et al. | 429/218 |
| 5,527,643 | 6/1996 | Sonobe et al. | 429/218 |

FOREIGN PATENT DOCUMENTS

0 165 047  11/1985  European Pat. Off. ......... H01M 4/96

*Primary Examiner*—Stephen Kalafut
*Assistant Examiner*—Jonathan S. Krueger
*Attorney, Agent, or Firm*—Sughrue,Mion,Zinn,Macpeak & Seas, PLLC

[57] ABSTRACT

A non-aqueous secondary battery comprises a positive electrode-active material, a negative electrode material and a non-aqueous electrolyte, wherein an electrode mixture for positive electrode containing the positive electrode-active material comprises a compound in which anions can be inserted at a voltage of not less than 3.9 V (with respect to an $Li^+/Li$ electrode). Moreover, the electrode mixture for positive electrode may further comprise at least one member selected from the group consisting of transition metals, elements of Group IIIB and IVB (except for C) and carbides thereof. The non-aqueous secondary battery can ensure safety against any overcharge and has a high discharge voltage. Moreover, the non-aqueous secondary battery permits increase in the charge capacity and discharge capacity without using any lithium compound in the electrode mixture for positive electrode, the reduction of the amount of the positive electrode-active material to be used and the improvement in the energy density of the resulting battery per unit volume.

23 Claims, 1 Drawing Sheet

FIG. 1

NON-AQUEOUS SECONDARY BATTERY

BACKGROUND OF THE INVENTION

The present invention relates to a non-aqueous secondary battery which is safe from overcharge and more specifically to a non-aqueous secondary battery which is safe from overcharge and which can ensure a high charge or discharge capacity and a high discharge voltage.

When a non-aqueous secondary battery having a high discharge voltage is overcharged, the temperature of the battery increases, a severe redox reaction takes place and as a result, the battery may sometimes catch fire and cause breakage. As measures against the overcharge, there have been put into practical use, for instance, techniques for controlling the voltage of charging devices, for fitting a protective circuit to the outside of the battery, for incorporating, into the battery, a current-cut off safety valve sensitive to the internal pressure change in the battery, for incorporating an internal pressure release valve into this safety valve and for incorporating a pressure-increasing agent such as $Li_2CO_3$ into the electrode mixture for positive electrodes. However, these techniques are accompanied by a variety of uncertainty concerning the production of the foregoing means. For instance, the protective circuit often malfunctions, the current-cut off part of the current-cut off safety valve cannot hold its contact condition over a long time period and does not ensure a constant sensitivity to pressure due to the limit in precision of the production techniques. In the worst case, the battery may correspondingly be overcharged.

Japanese Un-Examined Patent Publication (hereinafter referred to as "J. P. KOKAI") No. Sho 60-264052 discloses a battery which makes use of a calcined product of a cresol resin as an electrode material.

In addition, there has been used, in the negative electrode material for high discharge voltage non-aqueous secondary battery, compounds which cause a decrease in voltage through charging, for instance, naturally occurring graphite and carbonaceous compounds obtained by firing organic substances; transition metal oxides such as $WO_2$, $MoO_2$, $Fe_2O_3$ and $LiCoVO_4$; oxides of semi-metal elements such as SnO; nonmetal oxides such as SiO; transition metal chalcogenides such as $TiS_2$; and chalcogenides of semi-metal elements such as SnS. The use of such compounds is advantageous in that they can ensure safety since the voltage is low during assembling the battery using such compounds. However, these compounds can simply provide a battery which can discharge an energy lower than that charged and therefore, a positive electrode-active material must be used in a large amount and the capacity of the battery is correspondingly reduced. For this reason, there have been proposed a method for bringing the negative electrode material into contact with elemental lithium or butyl lithium as an active material (J. P. KOKAI Nos. Hei 4-259764 and Hei 5-54912), a method for preliminarily discharging with respect to a lithium metal negative electrode (J. P. KOKAI No. Hei 5-242911) and a method for adding butyl lithium to an electrolyte solution (J. P. KOKAI No. Hei 5-135760) in order to solve the problem of the foregoing low efficiency. However, these techniques have not yet been practically employed because of high reducing activity of these lithium compounds and the difficulty of handling the compounds in powdery states. Moreover, these lithium compounds react with water and therefore, water cannot be used for preparing a coating solution of the electrode mixture therefor when applying the electrode mixture to a current collector. Accordingly, it is necessary to provide an expensive and particular device for handling combustible organic solvents.

On the other hand, positive electrode-active materials, in particular, lithium transition metal oxides: $Li_xM_yO_2$ ($x \leq 1$; $y=1$) having an $\alpha$—$NaCrO_2$ lamellar structure such as $Li_xCoO_2$ and $Li_xNiO_2$ have been cited in a variety of Japanese Un-Examined Patent Publications.

Moreover, J. P. KOKAI Nos. Sho 63-121258 and Hei 5-54889 (corresponding to U.S. Pat. No. 5,286,582) propose a method in which elements belonging to Group IIIB or IVB of the Periodic Table are incorporated into the negative electrode materials.

SUMMARY OF THE INVENTION

Accordingly, it is an object of the present invention to provide a non-aqueous secondary battery which can ensure a high discharge voltage and high safety against any overcharge.

Another object of the present invention is to provide a non-aqueous secondary battery capable of ensuring high charge and discharge capacities and a high discharge voltage while ensuring high safety against any overcharge.

The inventors of this invention have conducted various studies to solve the foregoing problems associated with the conventional techniques. As a result, they have found out that these problems can effectively be solved by inserting anions into the electrode mixture for positive electrode when the battery is in an overcharge state to thus increase the internal resistance of the battery and by incorporating a specific carbonaceous substance into the electrode mixture for positive electrode and thus have completed the present invention.

According to the present invention, the foregoing objects can be accomplished by providing a non-aqueous secondary battery which comprises a positive electrode-active material, a negative electrode material and a non-aqueous electrolyte wherein an electrode mixture for positive electrode comprising the positive electrode-active material comprises a compound capable of inserting anions into the positive electrode-active material at a voltage of not less than 3.9 V with respect to an $Li^+/Li$ electrode.

More specifically, the insertion of anions into the positive electrode-active material when the battery is in an overcharge state results in an increase in the internal resistance of the battery and inhibition of any progress of the overcharge and ultimate termination of the overcharge.

According to a preferred embodiment of the present invention, the electrode mixture for positive electrode further comprises at least one member selected from the group consisting of transition metals, elements belonging to Group IIIB and IVB of the Periodic Table except for C and carbides of the transition metals and the elements belonging to Group IIIB and IVB of the Periodic Table except for C.

DESCRIPTION OF THE PREFERRED EMBODIMENTS

The present invention will hereinafter be described in more detail.

The positive and negative electrodes used in the non-aqueous secondary battery of the present invention can be produced by applying an electrode mixture for positive or negative electrode onto a current collector. The electrode mixture for positive or negative electrode may comprise, in addition to the positive or negative electrode-active material, a conductivity-imparting agent, a binder, a dispersant, a filler, an ion-conductive agent, a pressure-increasing agent and other various additives.

According to a preferred embodiment of the present invention, the electrode mixture for positive electrode may further comprise at least one member selected from the group consisting of transition metals, elements belonging to Group IIIB and IVB of the Periodic Table except for C and carbides of the transition metals and the elements belonging to Group IIIB and IVB of the Periodic Table except for C in order to impart high charge and discharge capacities to the resulting non-aqueous secondary battery in addition to the safety against the overcharge and a high discharge voltage.

The anions usable in the present invention are those included in the electrolyte solution such as $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^{2-}$, $(1,2$ -dimethoxyethane$)_2ClO_4^-$, lower aliphatic carboxylate ions, $AlCl_4^-$, $Cl^-$, $Br^-$, $I^-$, anions of chloroborane compounds and tetraphenyl borate ions, which may be used alone or in combination. In particular, the anions preferably comprise at least $ClO_4^-$, $BF_4^-$, $PF_6^-$ or $CF_3SO_3^-$. The anion particularly preferably comprises at least $PF_6^-$.

The compound capable of being doped with anions include, for instance, conductive polymer compounds having resonance structures or carbonaceous compounds. As the conductive polymer compound having a resonance structure, preferred are polymers of aromatic heterocyclic compounds, for instance, polyaniline, polyaniline derivatives, polypyrrole, polypyrrole derivatives, polythiophene, polythiophene derivatives, polyphenylene, polyphenylene derivatives and polydisulfide compounds. It is preferred that a part of these compounds are not doped with anions. In addition, examples of preferred compounds capable of being doped with anions include carbonaceous compounds, selected from, for instance, naturally occurring graphite, artificial graphite, vapor phase-grown carbon and carbon obtained by firing organic substances. These compounds also include those known as negative electrode materials. The carbonaceous compounds may comprise a small quantity of the graphite structure, but preferably has a high content of amorphous portion. Specific examples of carbonaceous compounds are naturally occurring graphite, petroleum coke, pitch coke, coal, carbon obtained by firing cresol resins, carbon obtained by firing furan resins, carbon obtained by firing polyacrylonitrile fibers, vapor phase-grown graphite, vapor phase-grown carbon, carbon obtained by firing mesophase pitch and polyacene.

Among these, preferred are carbon obtained by firing aromatic condensation polymer compounds and, in particular, carbon obtained by firing furan resins and carbon obtained by firing cresol resins. In addition, the carbonaceous compound may comprise different kinds of elements and/or compounds other than carbon. For instance, it may comprise B, P, N and/or S in an amount ranging from 0 to 10% by weight. Moreover, it may further comprise SiC and/or $B_3C$.

These compounds are doped with anions at a voltage of not less than 3.9 V (with respect to an $Li^+/Li$ electrode), in particular, 3.9 to 10 V, more preferably 4.1 to 10 V, in particular, 4.3 to 6 V in order to allow the compounds to safely perform their function. The doping with anions results in an increase in the resistance of the resulting battery. This can be demonstrated on the basis of the fact that if a battery is overcharged, the voltage thereof continues to increase without saturation and termination of the charging operation at a high voltage is accompanied by a high voltage drop.

The compound capable of being doped with anions used in the present invention preferably has a distance ($d_{002}$) between 002 planes, as determined by the X-ray diffractometric analysis of the compound prior to the anion-doping, of not less than 3.5 Å, in particular, 3.5 to 5 Å, more preferably 3.55 to 5 Å and in particular, 3.55 to 4.5 Å.

The compound capable of being doped with anions used in the present invention preferably has a crystallite size $L_c$, as determined by the X-ray diffractometric analysis of the compound prior to the anion-doping, of not more than 50 Å and in particular, 40 to 1 Å. Moreover, the atomic ratio: hydrogen/carbon included in the compound capable of being doped with anions prior to the anion-doping is preferably not more than 0.04, more preferably not more than 0.03 and most preferably not more than 0.02.

The foregoing compound desirably has characteristic values, i.e., $d_{002}$, value ranging from 3.5 to 5 Å, an $L_c$ ranging from 40 to 1 Å and the atomic ratio: hydrogen/carbon of not less than 0.001 and not more than 0.04.

The fact that the compound is doped with anions can in general be confirmed by determining whether the $d_{002}$ value in the X-ray diffraction pattern is increased or not, but it is difficult to evaluate the compound used in the invention by this method since the compound has a relatively large $d_{002}$, value. As another method, the anions included in the compound can be determined by, for instance, the elemental analysis, atomic absorption spectrometry or inductive coupled plasma emission spectroscopic analysis.

The calcined carbonaceous compound is preferably prepared by preliminarily firing a starting low molecular weight molecules or polymeric organic compound in an oxidizing gas atmosphere and then firing the pre-calcined starting material in a vacuum or in an inert gas atmosphere or directly firing the starting material under the foregoing conditions without preliminarily calcination of the material. The oxidizing gas usable herein is preferably oxygen, carbon dioxide or water vapor. The content of the oxidizing gas in the firing atmosphere preferably ranges from 5 to 100 % by volume. The firing temperature is preferably 200° to 4000° C., more preferably 500° to 3500° C. and most preferably 700° to 2000° C. The starting material is fired in at least one step, but may likewise preferably be fired by multiple firing steps. The inert gas usable herein may be selected from, for instance, nitrogen, argon, helium, xenon and krypton.

The average particle size of the carbonaceous compound preferably ranges from 0.1 to 100 μm, in particular, 0.1 to 60 μm. In particular, the compound has such a particle size distribution that not less than 90% (by volume) of the particles falls within the range of from 0.1 to 60 μm. The compound preferably has an average surface area ranging from 1 to 200 m²/g, in particular, 2 to 50 m²/g. The true density thereof preferably ranges from 1 to 3, in particular, 1.5 to 2.6. The carbonaceous compound having a desired particle size may be prepared through the use of any known pulverizer and classifying device, such as a mortar and a pestle, a ball mill, a vibrating ball mill, a satellite ball mill, a planetary ball mill, a spin flash jet mill, or a sieve. The pulverization and classification may be carried out by a dry or wet method.

The conductive polymer compound having a resonance structure can be synthesized by chemical synthesis or polymerization by electrolysis. The conductive polymer compound preferably has an average particle size and an average surface area identical to those of the foregoing carbonaceous compound.

The conductivity-imparting agent used in the present invention (i.e., the compound capable of being doped with anions) may be employed in combination with other conductivity-imparting agents which may be carbonaceous compounds and metals having a low ability of being doped with anions, but having high conductivity. For instance, it is preferred to use acetylene black, ketchen black, graphite, aluminum and/or titanium. The conductivity-imparting agent of the present invention (i.e., the compound capable of being doped with anions) is used in an amount ranging from 0.1 to 15 % by weight, preferably from 0.1 to 10% by weight, in particular, 1 to 7% by weight based on the total weight of the electrode mixture. In addition, the weight ratio of the conductivity-imparting agent having a high ability of being doped with anions to that having a low such ability preferably ranges from 0 to 20, in particular, 0.1 to 10.

The compound of the present invention (compound capable of being doped with anions) substantially serves as a well known conductivity-imparting agent or a current collector under the usual charge-discharge conditions, while it is doped with anions to increase the resistance of the battery only when the battery is abnormally charged. For this reason, the electrode mixture for positive electrode should necessarily contain a positive electrode-active material or a positive electrode material in addition to the compound of the present invention. Therefore, the compound of the present invention is completely different from the positive electrode-active materials or the active material-carrying positive electrode materials disclosed in, for instance, J. P. KOKAI No. Sho 60-264052.

As has been discussed above, the electrode mixture for positive electrode used in the present invention may comprise at least one member selected from the group consisting of transition metals, elements belonging to Group IIIB and IVB of the Periodic Table except for C and carbides of the transition metals and the elements belonging to Group IIIB and IVB of the Periodic Table except for C.

The term "transition metals or elements" herein means Sc (atomic number 21) to Zn (atomic number 30), Y (atomic number 39) to Cd (atomic number 48), and La (atomic number 57) to Hg (atomic number 80) in the Periodic Table.

The term "elements of Group IIIB and IVB of the Periodic Table" herein means B, Al, Ga, In, Tl, Si, Ge, Sn and Pb. Moreover, the term "semimetal" herein means Al, Ga, Ge, Sn, Pb, Sb, Bi and Po. Further the term "nonmetallic elements" herein means Si.

The ionic radius of the elements used in the present invention preferably ranges from 0.1 to 1.2 Å, in particular, 0.1 to 1.0 Å.

The elements used in the present invention are preferably Ti, Mn, Fe, Zn, Nb, W, B, Al, Si, Ge and Sn, with B and Si being particularly preferred.

The carbides used in the present invention are preferably $B_4C$, $SiC$, $Al_3C_4$, $WC$, $W_2C$, $TiC$, $Fe_3C$, $Mo_2C$ and $Co_2C$, with $B_4C$, $SiC$, $W_2C$, $MO_2C$ and $TiC$ being more preferred and $B_4C$, $SiC$ and $Mo_2C$ being particularly preferred.

These compounds used in the invention may partially be oxidized or may comprise different kinds of elements. In particular, they are preferably in the form of solid solutions such as alloys. For instance, preferred are alloys comprising at least two elements such as those comprising Sn and/or Pb and at least one element selected from the group consisting of, for instance, B, Zn, Bi, Co, Cu, Fe, Mn and Ti. Moreover, the compound may further comprise a dopant (such as $B^{3+}$ and $Sb^{5+}$) to thus increase the conductivity of semiconductors such as Si. In addition, the foregoing carbides may comprise a plurality of elements.

The amount of the elements and/or carbides used in the present invention is not restricted to a specific range, but preferably ranges from 0.01 to 10% by weight, in particular, 0.1 to 10% by weight and more preferably 0.2 to 5% by weight on the basis of the total weight of the electrode mixture for positive electrode.

The foregoing elements and compounds may be used alone or in any combination.

The battery of the present invention is initially charged at a temperature ranging from room temperature to 60° C. Moreover, a high charging voltage is preferably used for oxidizing the elements and compounds used in the invention. To this end, it is particularly preferred to use compounds having a cut off voltage for charging of not less than 3.9 V (with respect to an $Li^+/Li$ electrode) as positive electrode-active material.

The positive electrode-active material used in the invention may be any compound capable of absorbing and releasing light metal ions and it is selected from, in particular, transition metal oxides and transition metal chalcogenides, with transition metal oxides being preferred and lithium-containing transition metal oxides being particularly preferred. In this respect, examples of transition metals preferably used in the invention include Ti, V, Cr, Mn, Fe, Co, Ni, Cu, Nb, Mo and W. The oxide is preferably synthesized by firing a mixture of a lithium compound with a transition metal compound, as will be detailed below.

Examples of lithium compounds include oxides, oxo-acid salts and halides thereof. Examples of transition metal compounds are oxides of transition metals having 1 to 6 valency, salts thereof and complex salts thereof.

Preferred examples of lithium compounds used in the invention include lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium hexafluorophosphate, lithium fluoride, lithium chloride, lithium bromide, lithium iodide and lithium metasilicate.

The transition metal compounds usable herein may be oxides of transition metals having 1 to 6 valency, salts thereof and complex salts thereof, such as those listed in J. P. KOKAI No. Hei 6-243897. Specific examples of preferred transition metal compounds used in the invention are $TiO_2$, lithium titanate, titanyl acetylacetonate, titanium tetrachloride, titanium tetraiodide, ammonium titanyl oxalate, titanium sulfide, $VO_d$ (d is 2 to 2.5; the compound having a d value of 2.5 is vanadium pentoxide), lithium compounds of $VO_d$, vanadium hydroxide, ammonium metavanadate, ammonium orthovanadate, ammonium pyrovanadate, vanadium oxysulfate, vanadium oxytrichloride, vanadium tetrachloride, lithium chromate, ammonium chromate, cobalt chromate, chromium acetylacetonate, $MnO_2$, $Mn_2O_3$, manganese hydroxide, manganese carbonate, manganese nitrate, manganese sulfate, ammonium manganese sulfate, manganese sulfite, manganese phosphate, manganese borate, manganese chlorate, manganese perchlorate, manganese thiocyanate, manganese formate, manganese acetate, manganese oxalate, manganese citrate, manganese lactate, manganese tartrate, manganese stearate, manganese fluoride, manganese chloride, manganese bromide, manganese iodide, manganese acetylacetonate, iron oxides (di and trivalent), triiron tetraoxide, iron hydroxides (di and trivalent), iron chlorides (di and trivalent), iron bromides (di and trivalent), iron iodides (di and trivalent), iron sulfates (di and trivalent), ammonium iron sulfates (di and trivalent), iron nitrates (di and trivalent), iron phosphates (di and trivalent), iron perchlorate, iron chlorate, iron acetate (di and trivalent), iron citrate (di and trivalent), ammonium iron citrate (di and trivalent), iron oxalate (di and trivalent), ammonium iron oxalate (di and trivalent), iron sulfide, CoO, $Co_2O_3$, $Co_3O_4$, $LiCoO_2$, cobalt carbonate, basic cobalt carbonate, cobalt hydroxide, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide, cobalt iodide, hexaammine cobalt complex salts (salts with sulfuric acid, nitric acid, perchloric acid, thiocyanic acid, oxalic acid, acetic acid, fluoric acid, chloric acid, bromic acid and iodic acid), nickel oxide, nickel hydroxide, nickel carbonate, basic nickel carbonate, nickel sulfate, nickel nitrate, nickel fluoride, nickel chloride, nickel bromide, nickel iodide, nickel formate, nickel acetate, nickel acetylacetonate, copper oxide (mono and divalent), copper hydroxide, copper sulfate, copper nitrate, copper phosphate, copper fluoride, copper chloride, ammonium copper chloride, copper bromide, copper iodide, copper formate, copper acetate, copper oxalate, copper citrate, niobium oxychloride, niobium pentachloride, niobium pentaiodide, niobium monooxide, niobium dioxide, niobium trioxide, niobium pentoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithium molybdate, ammonium molybdophosphate, molybdenum oxide acetylacetonate, molybdenum sulfide, $WO_2$, $WO_3$, tungstic acid, ammonium tungstate and ammonium tungstophosphate.

Examples of particularly preferred transition metal compounds used in the invention are $TiO_2$, ammonium titanyl oxalate, $VO_d$ (d is 2 to 2.5), lithium compounds of $VO_d$, ammonium metavanadate, $MnO_2$, $Mn_2O_3$, manganese hydroxide, manganese carbonate, manganese nitrate, ammonium manganese sulfate, manganese acetate, manganese oxalate, manganese citrate, iron oxide (di and trivalent), triiron tetraoxide, iron hydroxides (di and trivalent), iron acetates (di and trivalent), iron citrates (di and trivalent), ammonium iron citrates (di and trivalent), iron oxalates (di and trivalent), ammonium iron oxalates (di and trivalent), CoO, $Co_2O_3$, $Co_3O_4$, $LiCoO_2$, cobalt carbonate, basic cobalt carbonate, cobalt hydroxide, cobalt oxalate, cobalt acetate, nickel oxide, nickel hydroxide, nickel carbonate, basic nickel carbonate, nickel sulfate, nickel nitrate, nickel acetate, copper oxide (mono and divalent), copper hydroxide, copper acetate, copper citrate, $MoO_3$, $MoO_2$, $LiMo_2O_4$, $WO_2$ and $WO_3$.

Examples of particularly preferred combinations of lithium compounds and transition metal compounds used in the invention are combinations of lithium hydroxide, lithium carbonate and/or lithium acetate with $VO_d$ (d is 2 to 2.5), lithium compounds of $VO_d$, ammonium metavanadate, $MnO_2$, $Mn_2O_3$, manganese hydroxide, manganese carbonate, manganese nitrate, iron oxide (di and trivalent), triiron tetraoxide, iron hydroxides (di and trivalent), iron acetates (di and trivalent), iron citrates (di and trivalent), ammonium iron citrate (di and trivalent), iron oxalate (di and trivalent), ammonium iron oxalate (di and trivalent), CoO, $Co_2O_3$, $Co_3O_4$, $LiCoO_2$ cobalt carbonate, basic cobalt carbonate, cobalt hydroxide, cobalt sulfate, cobalt nitrate, nickel oxide, nickel hydroxide, nickel carbonate, basic nickel carbonate, nickel sulfate, nickel nitrate, nickel acetate, $MoO_3$, $MoO_2$, $LiMo_2O_4$, and/or $WO_3$.

The positive electrode-active material used in the present invention may be prepared by mixing the foregoing lithium compound and the transition metal compound with a compound capable of enhancing the ionic conductivity of the active material such as $Ca^{2+}$ (for instance, calcium carbonate, calcium chloride, calcium oxide, calcium hydroxide, calcium sulfate, calcium nitrate, calcium acetate, calcium oxalate, calcium citrate and/or calcium phosphate) or an amorphous network structure-forming agent (such as $P_2O_5$, $Li_3PO_4$, $H_3BO_3$, $B_2O_3$ and/or $SiO_2$) and then firing the resulting mixture. Moreover, the foregoing lithium compound and the transition metal compound may be mixed with alkali metal ions such as Na, K or Mg ions and/or a compound containing Si, Sn, Al, Ga, Ge, Ce, In and/or Bi (for instance, oxides, hydroxides, carbonates or nitrates thereof) and then fired to give the positive electrode-active material used in the present invention. In particular, the lithium compound and the transition metal compound is preferably mixed with, in particular, calcium carbonate or $P_2O_5$, $B_2O_3$, $SiO_2$ and then fired. The amount thereof to be added is not restricted to a specific range, but preferably ranges from 0 to 20 mole %.

Examples of preferred positive electrode-active materials simultaneously used in the present invention are transition metal oxides and transition metal sulfides, with manganese dioxide, vanadium pentoxide, iron oxides, molybdenum oxides, molybdenum sulfides, cobalt oxides, iron sulfide and titanium sulfides being particularly preferred.

Examples of preferred positive electrode-active materials simultaneously used in the present invention other than those listed above include lithium-containing transition metal oxides, in particular, those represented by the general formula: $Li_xM_yO_z$ (wherein M mainly comprises at least one element selected from the group consisting of V, Mn, Fe, Co and Ni; x is 0.05 to 1.2; y is 1 or 2; and z is 1.5 to 5). In addition, the positive electrode-active material may further comprise an alkali metal other than lithium, an alkaline earth metal, a transition metal other than those defined above by M, or an element belonging to Group IIIB to VB of the Periodic Table (such as Al, Ga, In, Ge, Sn, Pb, Sb, Bi). Moreover, the active material may likewise comprise, for instance, P and/or B.

Examples of more preferred positive electrode-active materials of lithium-containing transition metal oxides simultaneously used in the invention are $Li_xCoO_2$, $Li_xNiO_2$, $Li_xCo_aMg_{1-a}O_2$, $Li_xCo_aSi_{1-a}O_2$, $Li_xCo_aB_{1-a}O_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$ and $Li_xMn_bFe_{1-b}O_z$ (wherein x is 0.05 to 1.2; a is 0.1 to 0.9; b is 0.8 to 0.98; z is 1.5 to 5).

Examples of most preferred positive electrode-active materials of lithium-containing transition metal oxides simultaneously used in the invention are $Li_xCoO_2$, $Li_xNiO_2$, $Li_xCo_aNi_{1-a}O_2$, $Li_xMn_2O_4$ and $Li_xCo_bV_{1-b}O_z$ (wherein x=0.05 to 1.2; a=0.1 to 0.9; b=0.9 to 0.98; z=2.02 to 2.3).

The positive electrode-active material used in the invention may be synthesized by mixing the lithium compound and the transition metal compound and then firing the mixture or by a solution reaction, with the firing method being particularly preferred.

The firing temperature used in the present invention is such that a part of the compounds, used in the invention and admixed together are decomposed or melted at that temperature. For instance, it preferably ranges from 250° to 2000° C., in particular, 350° to 1500° C. When firing the mixture, it is preferably calcined at a temperature ranging from 250° to 900° C. The calcination time preferably ranges from 1 to 72 hours and more preferably 2 to 20 hours. The starting materials may be mixed by either a dry method or a wet method.

Moreover, the starting materials may be annealed at a temperature ranging from 200° to 900° C. after the firing.

The gas atmosphere used for the firing is not restricted to specific one and may be an oxidizing or reducing gas atmosphere. Examples thereof include air, a gas having an arbitrarily controlled oxygen concentration, hydrogen, carbon monoxide, nitrogen, argon, helium, krypton, xenon and carbon dioxide gas atmospheres.

When synthesizing the positive electrode-active material used in the invention, lithium ions may be chemically inserted into the transition metal oxide by reacting elemental lithium, a lithium alloy or butyl lithium with the transition metal oxide.

The average particle size of the positive electrode-active material used in the invention is not restricted to a particular range, but preferably in the range of from 0.1 to 50 μm. Moreover, not less than 95% (by volume) of the particles preferably has a particle size ranging from 0.5 to 30 μm. The specific surface area thereof is not restricted to a specific range, but preferably ranges from 0.01 to 50 m$^2$/g as determined by the BET method. The pH value of the supernatant obtained when 5 g of the positive electrode-active material is dissolved in 100 ml of distilled water is preferably not less than 7 and not more than 12.

The positive electrode-active material having a desired particle size can be prepared using any known pulverizer and classifying device, such as a mortar and a pestle, a ball mill, a vibrating ball mill, a satellite ball mill, a planetary ball mill, a spin flash jet mill or a sieve.

The positive electrode-active material prepared by the firing may be washed with water, an acidic aqueous solution, an alkaline aqueous solution or an organic solvent before practical use.

The negative electrode material preferably used in the present invention may be any compound capable of absorbing and releasing light metal ions and it can be selected from, in particular, light metals and alloys thereof, carbonaceous compounds, inorganic oxides, inorganic chalcogenides, metal complexes and organic polymers. More preferably, it is selected from the group consisting of carbonaceous compounds, inorganic oxides and organic polymers. These compounds may be used alone or in any combination. For instance, preferred are combinations of light metals with carbonaceous compounds, light metals with inorganic oxides, and light metals, carbonaceous compounds and inorganic oxides.

The light metal is preferably lithium, and the alloy of the light metal is preferably lithium alloys (such as Li-Al, Li-Al-Mn, Li-Al-Mg, Li-Al-Sn, Li-Al-In, Li-Al-Cd). Preferred carbonaceous compounds are those capable of being doped with and releasing lithium ions or lithium metal. The carbonaceous compound is selected from the group consisting of, for instance, naturally occurring graphite, artificially synthesized graphite, vapor phase-grown carbon and carbon obtained through firing of organic substances. The carbonaceous compounds preferably include at least a small quantity of the graphite structure. Specific examples of carbonaceous compounds are naturally occurring graphite, petroleum coke, pitch coke, coal, carbon obtained by firing cresol resins, carbon obtained by firing furan resins, carbon obtained by firing polyacrylonitrile fibers, vapor phase-grown graphite, vapor phase-grown carbon and carbon obtained by firing mesophase pitch. In addition, the carbonaceous compound may comprise different kinds of compounds other than carbon. For instance, it may comprise B, P, N and/or S in an amount ranging from 0 to 10% by weight. Moreover, it may further comprise SiC and/or BC, $B_3C$ or $B_4C$.

The inorganic oxide is selected from the group consisting of transition metal oxides, semi-metal oxides and combination thereof. Examples of transition metal are V, Ti, Fe, Mn, Co, Ni and Zn which may be used alone or in any combination. For instance, preferred are $Fe_2O_3$, $Co_2O_3$, $VO_2(B)$, $WO_2$, $WO_3$, $MoO_2$, $MoO_3$ and lithium-containing transition metal oxides. Among these compounds, preferred are those represented by the general formula: $Li_eM_fO_g$ (wherein M is at least one member selected from the group consisting of V, Ti, Mn, Fe, Co, Ni and Zn; e is 0.1 to 3; and f is 1 or 2; g is 1 to 5.5).

Among them, particularly preferred are those disclosed in J. P. KOKAI No. Hei 6-44972 and represented by the following general formula: $Li_pCo_qV_{1-q}O_r$ (wherein p is 0.1 to 2.5; b is 0 to 1; and z is 1.3 to 4.5).

The semi-metal oxide is selected from oxides mainly comprising elements of Group III to V of the Periodic Table. For instance, it may be, oxides of Al, Ga, si, Sn, Ge, Pb, Sb and Bi and may be used alone or in combination. Specific examples thereof are oxides such as $Al_2O_3$, $Ga_2O_3$, SiO, $SiO_2$, GeO, $GeO_2$, SnO, $SnO_2$, $SnSiO_3$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $Li_2SiO_3$, $Li_4Si_2O_7$, $Li_2Si_3O_7$, $Li_2Si_2O_5$, $Li_8SiO_6$, $Li_6Si_2O_7$, $Li_2GeO_3$, $Li_4GeO_4$, $Li_8GeO_6$, $Li_2SnO_3$, $Li_8SnO_6$, $Li_2PbO_3$, $Li_4PBO_4$, $LiBiO_2$, $Li_3BiO_4$, $Li_5BiO_5$, $LiSbO_4$, $Li_4MgSn_2O_7$, $Li_2MgSn_2O_5$, $SnSiO_{0.01}O_{1.02}$, $SnP_{0.01}O_{1.03}$, $SnB_{0.3}O_{1.45}$, $SnSi_{0.7}P_{0.3}O_{2.75}$, $SnSi_{0.7}Ge_{0.1}P_{0.2}O_{3.1}$, $SnSi_{0.3}Al_{0.1}P_{0.3}O_{3.1}$, $SnSi_{0.3}Al_{0.1}B_{0.2}P_{0.3}O_{3.2}$ and $Sn_{0.8}Si_{0.5}Al_{0.1}B_{0.2}P_{0.3}O_{3.0}$, with compounds such as SnO, $SnO_2$, GeO, $GEO_2$, $SnSiO_3$ and $Li_2SnO_3$ being particularly preferred.

The inorganic chalcogenides may be selected from sulfides of the metals and semi-metals listed above in connection with the inorganic oxides. For instance, preferred are sulfides such as $TiS_2$, GeS, $GeS_2$, SnS, $SnS_2$, PbS, $PbS_2$, $Sb_2S_3$, $Sb_2S_5$ and $SnSiS_3$.

The inorganic oxides and inorganic chalcogenide compounds used in the invention may be in a crystalline or amorphous state when they are incorporated into a battery, but preferably mainly in an amorphous state.

The term "amorphous state" herein means those exhibiting a broad scattering band having a peak within the range of from 20° to 40° as expressed in terms of the 2θ value as determined by the X-ray diffractometry using CuKα rays. The compounds in the amorphous state may have crystalline diffraction lines. Preferably, the highest intensity of the crystalline diffraction lines observed at the 2θ value of not less than 40° and not more than 70° is not more than 500 times, more preferably not more than 100 times, in particular, not more than 5 times the diffraction intensity of the peak of the broad scattering band at the 2θ value of not less than 20° and not more than 40° and it is most preferred that the compounds do not show any crystalline diffraction line.

To prepare such amorphous compounds, it is preferred to add an amorphous network structure-forming agent to the chalcogenides and the oxides of Group III to V elements. For instance, preferred amorphous network structure-forming agents are oxides of B, P, Si, Al and/or V. The negative electrode-active material is preferably synthesized in the presence of, for instance, $P_2O_5$, $Li_3PO_4$, $H_3BO_3$, $B_2O_3$, $SiO_2$, $V_2O_5$ and/or $Al_2O_3$. Specific examples include the compounds listed above such as $SnP_{0.01}O_{1.03}$, $SnB_{0.3}O_{1.45}$, $SnSi_{0.7}P_{0.3}O_{2.75}$, $SnSi_{0.7}Ge_{0.1}P_{0.2}O_{3.1}$, $SnSi_{0.3}Al_{0.1}P_{0.3}O_{3.1}$, $SnSi_{0.3}Al_{0.1}B_{0.2}P_{0.3}O_{3.2}$ and $Sn_{0.8}Si_{0.5}Al_{0.1}B_{0.2}P_{0.3}O_{3.0}$.

The foregoing carbonaceous compounds and oxides are preferably used as the negative electrode-active materials in the present invention. This is because they can provide a non-aqueous secondary battery having high charge and discharge capacities, a high discharge voltage, high safety and high charge-discharge cycle life.

The foregoing oxides used in the present invention can be prepared by either a firing method or a solution method. When the oxides are synthesized by the firing method, the firing is preferably carried out under the following firing conditions: a rate of temperature raise of not less than 4° C./min and not more than 2000° C./min, more preferably not less than 6° C./min and not more than 2000° C./min, in particular, not less than 10° C./m in and not more than 2000° C./min; a firing temperature of not less than 250° C. and not more than 1500° C., more preferably not less than 350° C. and not more than 1500° C., in particular, not less than 500° C. and not more than 1500° C.; a firing time of not less than 0.01 hour and not more than 100 hours, more preferably not less than 0.5 hour and not more than 70 hours, in particular, not less than one hour and not more than 20 hours; a rate of temperature drop of not less than 2° C./min and not more than $10^7$° C./min, more preferably not less than 4° C./min and not more than $10^7$° C./min, in particular, not less than 6° C./min and not more than $10^7$° C./min and most preferably not less than 10° C./min and not more than $10^7$° C./min.

The term "rate of temperature raise" used herein means the averaged rate of raising temperature taken in the range of from "50% of the firing temperature (expressed by °C.)" to "80% of the firing temperature (expressed by °C.)", while the term "rate of temperature drop" used herein means the averaged rate of reducing temperature taken in the range of from "80% of the firing temperature (expressed by °C.)" to "50% of the firing temperature (expressed by °C.)".

The temperature drop can be performed by cooling in the firing furnace or by removing the fired product from the firing furnace and then cooling the product through, for instance, immersion thereof in water. In addition, it is also possible to use super quenching methods as disclosed in "Ceramics Processing", p. 217 (1987), published by Gihodo Publishing Company, such as gun method, Hammer-Anvil method, slap method, gas atomization method, plasma spray method, centrifugal quenching method and melt drag method. Moreover, the fired product can likewise be cooled by single roller method and double roller method as disclosed in New Glass Handbook, p. 172 (1991), published by Maruzen Publishing Company. When using materials capable of being melted during the firing, the raw materials may be continuously supplied to the firing furnace during the firing step while continuously removing the fired product from the furnace. When the materials are melted during the firing, the resulting melt is preferably stirred during the firing step.

The gas atmosphere for firing is preferably an atmosphere having an oxygen content of not more than 5% by volume, more preferably an inert gas atmosphere. Examples of the gas atmospheres are air, a gas whose oxygen content is arbitrarily controlled, hydrogen, carbon monoxide, nitrogen, argon, helium, krypton, xenon and carbon dioxide gas atmospheres.

The average particle size of the oxides used as the negative electrode materials in the present invention is not restricted to a specific range, but preferably ranges from 0.1 to 60 µm and more preferably 0.5 to 30 µm. The negative electrode material having a desired particle size may be prepared through the use of any well-known pulverizer and classifying device, such as a mortar and a pestle, a ball mill, a sand mill, a vibrating ball mill, a satellite ball mill, a planetary ball mill, a spin flash jet mill, or a sieve. The pulverization may optionally be carried out by wet pulverization in the presence of water or an organic solvent such as methanol. It is preferred to classify the resulting fired product in order to obtain a fired product having a desired particle size. The method for classification is not restricted to a specific one and the classification may be carried out using a sieve or a classification device by wind power. The pulverization and classification may be carried out by a dry or wet method.

The chemical formula of the compound obtained through the firing is determined by the inductive coupled plasma (ICP) emission spectroscopic analysis and a simplified method in which the chemical formula is estimated from the difference between the weights of powdery products determined before and after the firing.

A light metal is incorporated into the negative electrode material used in the present invention in such an amount that the potential approximately reaches the deposition potential of the light metal. For instance, the amount thereof preferably ranges from 50 to 700 mole % and, in particular, 100 to 600 mole % based on the amount of the negative electrode material. It is more preferred that the released amount of the light metal be higher with respect to the inserted amount thereof. The insertion of the light metal is preferably carried out by an electrochemical, chemical or thermal method. The electrochemical method preferably comprises the step of electrochemically inserting the light metal included in the positive electrode-active material into the negative electrode material, or directly electrochemically inserting the light metal or an alloy thereof into the negative electrode material. Examples of the chemical method include those comprising admixing the negative electrode material with the light metal, those comprising bringing the active material into contact with the light metal or those comprising reacting the active material with an organometal of the light metal such as butyl lithium. It is preferred in the present invention to use electrochemical and chemical insertion methods. Particularly preferred light metal is lithium or lithium ion.

The surface of the oxide used in the present invention as the positive electrode-active material or negative electrode material may be covered with an oxide having a chemical formula different from that of the positive electrode-active material or negative electrode material. The surface-coating oxide is preferably an oxide comprising a compound soluble in acidic and alkaline substances. Moreover, a metal oxide having high electron-conductivity is preferably used as such an oxide. For instance, it is preferred to use $SiO_2$, $PbO_2$, $Fe_2O_3$, $SnO_2$, $In_2O_3$, $ZnO$ or these oxides doped with dopants (such as metals each having a valency different from the metal constituting the oxide and halogen atoms in case of oxides), with $SiO_2$, $SnO_2$, $Fe_2O_3$, $ZnO$ and $PbO_2$ being particularly preferred.

The amount of the surface-treated metal oxide preferably ranges from 0.1 to 10 % by weight, in particular 0.2 to 5% by weight and most preferably 0.3 to 3% by weight based on the positive electrode-active material or negative electrode material.

Moreover, the surface of the positive electrode-active material or negative electrode material may be modified. For instance, the surface of the metal oxide may be subjected to a treatment with an esterifying agent, a chelating agent, a conductive polymer and/or polyethylene oxide.

In addition, the surface of the negative electrode material may be modified. For instance, the surface may be modified by application of a layer of an ion-conductive polymer or polyacetylene. Furthermore, the positive electrode-active material or negative electrode material may be subjected to a purification step such as a water washing step.

Additives such as a conductivity-imparting agent, a binder, a filler, a dispersant, an ion-conductive agent, a pressure-increasing agent and/or other various additives may be incorporated into the electrode mixture for electrodes used herein.

The conductivity-imparting agent may be any electron-conductive material which does not undergo any chemical change in the assembled battery. In general, the electrode mixtures for electrodes may comprise at least one conductive material selected from the group consisting of naturally occurring graphite (such as scaly graphite, flaky graphite and clayey graphite), artificial graphite, carbon black, acetylene black, ketchen black, carbon fibers, powdery metals (such as copper, nickel, aluminum and silver), metal fibers, polyphenylene derivatives and mixtures thereof. In particular, the use of graphite is preferred because the resulting battery exhibits improved charge-discharge cycle life and the use of acetylene black is preferred because the resulting battery has high charge and discharge capacities. Moreover, the use of the combination of graphite and acetylene black is particularly preferred.

The amount of the conductivity-imparting agent to be incorporated into the electrode mixtures for electrodes is not restricted to a specific range, but preferably ranges from 1 to 50% by weight, in particular, 1 to 30% by weight based on the total weight of the electrode mixture. In particular, the amount is preferably 1 to 15% by weight, more preferably 1 to 10%, and most preferably 1 to 5% by weight in case of carbon and graphite. It is preferred to use graphite alone or a combination of graphite and carbon black. In the latter case, the weight ratio of graphite to carbon black preferably ranges from 10/1 to 1/10, in particular, 5/1 to 1/5.

As the binder, there may be used, for instance, polysaccharides, thermoplastic resins and polymers exhibiting rubber elasticity, which may be used alone or in any combination. Examples of preferred binders are starch, polyvinyl alcohol, carboxymethyl cellulose, hydroxypropyl cellulose, regenerated cellulose, diacetyl cellulose, polyvinyl chloride, polyvinyl pyrrolidone, poly(tetrafluoroethylene), poly(vinylidene fluoride), polyethylene, polypropylene, ethylene-propylene-diene terpolymer (EPDM), sulfonated EPDM, styrene-butadiene rubber, polybutadiene, fluororubber and polyethylene oxide. In this respect, when using a compound such as a polysaccharide carrying functional groups reactive with lithium, it is preferred to deactivate the functional groups through the addition of a compound having a group reactive therewith such as an isocyanate group. The amount of the binder to be added is not restricted to a specific range, but preferably ranges from 1 to 50% by weight, in particular, 2 to 30% by weight based on the total weight of the electrode mixture. The binder may uniformly or non-uniformly be distributed in the electrode mixture.

The filler usable herein may be any fibrous material which does not undergo any chemical change in the assembled battery. In general, the electrode mixtures for electrodes may comprise, as such a filler, olefinic polymers such as polypropylene and polyethylene; and/or fibers of, for instance, glass and carbon. The amount of the filler is not restricted to a specific range, but preferably ranges from 0 to 30% by weight on the basis of the total weight of the electrode mixture for electrodes.

The ion-conductive agent usable herein may be those known as inorganic and organic solid electrolytes and details thereof will be described in connection with the electrolyte solution. The pressure-increasing agent is a compound capable of increasing the internal pressure of the battery as will be detailed below and typical examples thereof are carbonates.

The electrolyte in general comprises a solvent and a lithium salt soluble in the solvent (anions and lithium cations). Examples of the solvents include aprotic organic solvents such as propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolan, formamide, dimethylformamide, dioxolan, acetonitrile, nitromethane, ethyl momoglyme, phosphoric acid triester, trimethoxymethane, dioxolan derivatives, sulfolane, 3-methyl-2-oxazolidinone, propylene carbonate derivatives, tetrahydrofuran derivatives, ethyl ether and 1,3-propanesultone, which may be used alone or in combination.

As the counterpart (anions) of lithium in the lithium salt soluble in these solvents may be, for instance, $ClO_4^-$, $BF_4^-$, $PF_6^-$, $CF_3SO_3$, $CF_3CO_2^-$, $AsF_6^-$, $SbF_6^-$, $(CF_3SO_2)_2N^-$, $B_{10}Cl_{10}^{2-}$, $(1,2$-dimethoxyethane$)_2ClO_4^-$, lower aliphatic carboxylate ions, $AlCl_4^-$, $Cl^-$, $Br^-$, $I^-$, anions of chloroborane compounds and tetraphenyl borate ions, which may be used alone or in combination. Among these, the electrolyte preferably comprises a cyclic carbonate and/or a non-cyclic carbonate. For instance, the electrolyte preferably comprises diethyl carbonate, dimethyl carbonate, methyl ethyl carbonate or ethylene carbonate. Moreover, the electrolyte preferably comprises in addition to ethylene carbonate, propylene carbonate. Preferred are electrolytes comprising a mixture of ethylene carbonate and a proper amount of propylene carbonate, 1,2-dimethoxyethane, dimethyl carbonate or diethyl carbonate and $LiCF_3SO_3$, $LiClO_4$, $LiBF_4$ and/or $LiPF_6$. In particular, these supporting salts preferably comprise $LiPF_6$. The use of a combination of ethylene carbonate/ diethyl carbonate/dimethyl carbonate with $LiBF_4$ and $LiPF_6$ is most preferred.

The amount of these electrolytes to be incorporated into the battery is not restricted to a specific range, but is appropriately determined depending on the amounts of positive electrode-active materials and negative electrode materials and the size of the desired battery.

The volumetric ratio of a solvent mixture is not likewise limited to a specific range, but in case of a mixed solvent comprising ethylene carbonate and 1,2-dimethoxyethane and/or diethyl carbonate, the ratio of ethylene carbonate to the latter (1,2-dimethoxyethane and/or diethyl carbonate) preferably ranges from 0.4/0.6 to 0.6/0.4 (when the mixed solvent comprises both 1,2-dimethoxyethane and diethyl carbonate, the ratio of the former to the latter ranges from 0.4/0.6 to 0.6/0.4). When propylene carbonate is added, the amount thereof preferably ranges from 1 to 20% by volume. When dimethyl carbonate is added, the amount thereof preferably ranges from 1 to 20% by volume.

The concentration of a supporting electrolyte is not restricted to a particular range, but preferably in the range of from 0.2 to 3 moles per liter of the electrolyte solution.

Moreover, the following solid electrolytes may be used in combination with the foregoing electrolyte solutions.

The solid electrolytes may be divided into inorganic solid electrolytes and organic solid electrolytes. Examples of well known inorganic solid electrolytes usable in the present invention include nitride, halides and oxo acid salts of lithium. Among these, effectively used herein are $Li_3N$, $LiI$, $Li_5NI_2$, $Li_3N$-$LiI$-$LiOH$, $Li_4SiO_4$, $Li_4SiO_4$-$LiI$-$LiOH$, $x Li_3PO_4$-$(1-x) Li_4SiO_4$, $Li_2SiS_3$ and phosphorus sulfide compounds.

On the other hand, examples of organic solid electrolytes effectively used herein are polyethylene oxide derivatives or polymers comprising polyethylene oxide derivatives; polypropylene oxide derivatives or polymers comprising polypropylene oxide derivatives; ionizable group-containing polymers; mixtures of ionizable group-containing polymers and the foregoing aprotic electrolytes; polymers of phosphoric acid esters; and polymer matrix materials comprising aprotic polar solvents. Alternatively, it has also been known to use an electrolyte to which polyacrylonitrile is added or to use a combination of inorganic and organic solid electrolytes.

Other compounds may be added to the electrolyte in order to improve the discharge and/or charge-discharge characteristics of the resulting battery. Examples of such compounds are pyridine, triethyl phosphite, triethanolamine, cyclic ethers, ethylenediamine, n-glyme, hexaphosphoric acid triamide, nitrobenzene derivatives, sulfur, quinoneimine dyes, N-substituted oxazolidinones and N,N'-substituted imidazolidinones, ethylene glycol dialkyl ethers, quaternary ammonium salts, polyethylene glycol, pyrrole, 2-methoxyethanol, $AlCl_3$, conductive polymers-monomers of electrode mixture for electrodes, triethylene phosphoramide, trialkyl phosphines, morpholine, aryl compounds carrying carbonyl groups, crown ethers such as 12-crown-4, hexamethyl phosphoric triamide and 4-alkylmorpholine, dicyclic tertiary amines, oils, quaternary phosphonium salts and tertiary sulfonium salts.

A halogen atom-containing solvent such as carbon tetrachloride or trifluorochloroethylene may be added to the electrolyte to make the electrolyte noncombustible (J. P. KOKAI No. Sho 48-36632). In addition, carbon dioxide gas may be added to the electrolyte in order to impart good storability at a high temperature to the electrolyte (J. P. KOKAI No. Sho 59-134567).

Moreover, the electrode mixture for positive and negative electrodes may comprise an electrolyte solution or an electrolyte. There has been known, for instance, a method which comprises adding the foregoing ion-conductive polymer, nitromethane (J. P. KOKAI No. Sho 48-36633) or an electrolyte solution (J. P. KOKAI No. Sho 57-124870) to the electrode mixture for electrodes.

The non-aqueous secondary battery of the present invention further comprises a separator. The separators usable herein are, for instance, microporous thin films each having a high ion-permeability, a desired mechanical strength and insulating properties. In addition, the separator preferably shows such a function that it closes the pores at a temperature of not less than 80° C. to thus increase the resistance. Examples thereof include sheets and non-woven fabrics of olefinic polymers such as polypropylene and/or polyethylene, fluoropolymers such as poly(tetrafluoroethylene) or glass fibers because of their high resistance to organic solvents and hydrophobicity. When different polymers are simultaneously used, the separator may be a film of the mixture thereof or a laminate of the films thereof. The pore size of the separator falls within the range generally used in the field of batteries. For instance, it ranges from 0.01 to 10 μm. The thickness of the separator also falls within the range generally adopted in the field of batteries. For instance, it ranges from 5 to 300 μm. The separator may be prepared by synthesizing a polymer and then forming micropores by a dry method, a drawing method, a solution method, a solvent-removing method or any combination thereof.

A current collector for the electrode-active materials may be any electron conductor which does not undergo any chemical change in the assembled battery. Examples of materials for current collectors are stainless steel, nickel, aluminum, titanium, carbon and those obtained by treating the surface of, for instance, aluminum and stainless steel with carbon, nickel, titanium or silver for the positive electrode, with aluminum and aluminum alloys being particularly preferred. Examples of materials for current collectors are stainless steel, nickel, copper, titanium, aluminum, carbon, those obtained by treating the surface of, for instance, copper and stainless steel with carbon, nickel, titanium or silver and Al-Cd alloys for the negative electrode, with copper and copper alloys being particularly preferred. The surface of these materials may optionally be oxidized. The current collector is desirably surface-treated so that the collector has surface-roughness. The current collector may have any shape such as foils, films, sheets, nets, punched sheets, lath bodies, porous bodies, foamed sheets and molded bodies of fibers. The thickness thereof is not limited to a particular range, but in general ranges from 1 to 500 μm.

The non-aqueous secondary battery of the present invention may have any shape such as coin, button, sheet, cylinder, flat and square shapes.

If the battery has a coin or button-like shape, the electrode mixtures for positive and negative electrode-active materials are mainly compression-molded into pellet-like shapes prior to the practical use. The thickness and diameter of the pellet are determined on the basis of the size of each finally assembled battery. On the other hand, if the battery has a sheet, cylinder or square shape, the electrode mixtures for positive and negative electrode-active materials are mainly applied (or coated) onto a current collector, dried and compressed prior to the practical use. The active materials may be applied according to any method currently used in this field, for instance, reverse-roll coating, direct-roll coating, blade coating, knife coating, extrusion coating, curtain coating, gravure coating, bar coating, dip coating and squeeze roll coating, with the blade, knife and extrusion coating methods being preferred. The coating operation is preferably carried out at a coating speed ranging from 0.1 to 100 m/min. In this respect, the coated layer may have excellent surface conditions if the coating method is selected from those listed above depending on the physical properties of the solution of the electrode mixture and the drying characteristics thereof. The sides of the current collector may separately or simultaneously be coated with the electrode mixture. Moreover, the coating operation may continuously or intermittently be carried out, or the electrode mixture may be applied to the current collector in a striped pattern. The thickness, length and width thereof are likewise determined depending on the size of each finally assembled battery, but the thickness of the layer coated on each side particularly preferably ranges from 1 to 2000 μm as determined after drying and compressing.

The pellet or sheet can be dried or dehydrated by the currently adopted methods. Particularly preferred drying or dehydrating methods are, for instance, hot air, vacuum, infrared, far infrared, electron beam and low humidity air drying methods which may be used alone or in any combination. The drying temperature preferably ranges from 80° to 350° C., in particular 100° to 250° C. The overall moisture content of the whole battery is preferably not more than 2000 ppm and the electrode mixtures for positive and negative electrodes and the electrolyte preferably have a moisture content of not more than 500 ppm, respectively, from the viewpoint of charge-discharge cycle characteristics (or cycle life).

The pellet and sheet may be compressed according to the methods currently adopted, but preferred are mold pressing and calender pressing methods. The pressure during pressing is not restricted to a specific range, but preferably ranges from 0.2 to 3 t/cm$^2$. The pressing speed in the calender pressing method preferably ranges from 0.1 to 50 m/min. The temperature during pressing preferably ranges from room temperature to 200° C. The ratio of the width of the positive electrode sheet to that of the negative electrode sheet preferably ranges from 0.9 to 1.1, in particular 0.95 to 1.0. The ratio of the content of the positive electrode-active material to that of the negative electrode material varies depending on the kinds of compounds and the formulations of the electrode mixtures and cannot clearly be defined, but can be set at a level while taking into consideration the capacity, the charge-discharge cycle life and safety of the finally assembled battery.

The sheets of the electrode mixtures are put in layers through a separator, then wound or folded, inserted into a can, followed by electrical connection of the can to the sheets, injection of an electrolyte solution and sealing of the can with a sealing plate to complete a battery. In this respect, a safety valve may be used instead of the sealing plate. The battery of the present invention may likewise be provided with conventionally known various safety elements in addition to the safety valve. For instance, fuse, bimetallic element and/or PTC element may be used as overcurrent-inhibitory elements. In addition to the safety valve, as a means for preventing any increase in the internal pressure of the battery can, there may be used, for instance, a method for making cuts on the battery can, a method for making cuts on a gasket, a method for making cuts on the sealing plate or a method for cutting lead plates. Moreover, a protective circuit provided with a built-in measure for preventing any overcharge and/or overdischarge can be incorporated into a charging device or a separate protective circuit may be connected to the charging device. Moreover, the battery may be provided with a system for cutting off the current in response to an increase in the internal pressure of the battery. In this respect, a compound capable of increasing the internal pressure may be incorporated into the electrode mixtures or the electrolyte. Examples of such compounds are carbonates such as $Li_2CO_3$, $LiHCO_3$, $Na_2CO_3$, $NaHCO_3$, $CaCO_3$ and $MgCO_3$.

The battery can and lead plates used in the present invention may be prepared from conductive metals and alloys. Examples thereof include metals such as iron, nickel, titanium, chromium, molybdenum, copper and aluminum as well as alloys thereof. The cap, can, sheets and lead plates may be welded by any known method (such as direct or alternating current electric welding, laser welding and ultrasonic welding). As sealing agents for sealing the battery, there may be used, for instance, conventionally known compounds and mixtures such as asphalt.

The preferred combinations of the components for the battery in the present invention are of course those of the aforementioned preferred chemical materials and parts for assembling the battery, but particularly preferably the positive electrode-active material comprises at least one compound selected from the group consisting of $Li_xCoO_2$, $Li_xNiO_2$, $Li_xNi_{0.9}Co_{0.1}O_2$, $Li_xMnO_2$ and $Li_xMn_2O_4$ (wherein x is 0.05 to 1.2); the conductivity-imparting agent comprises only a carbonaceous compound obtained by firing furan resins and/or cresol resins, or a combination of the carbonaceous compound with acetylene black; the current collector for positive electrode is prepared from stainless steel or aluminum and formed into a net, sheet, foil or lath shape; the negative electrode material may comprise at least one member selected from the group consisting of elemental lithium, lithium alloys (such as Li-Al), carbonaceous compounds, oxides (such as $LiCoVO_4$, $SnO_2$, $SnO$, $SiO$, $GeO_2$, $GeO$, $SnSiO_3$, $SnSi_{0.3}Al_{0.1}B_{0.2}P_{0.3}O_{3.2}$, $Sn_{0.8}Si_{0.5}Al_{0.1}B_{0.2}P_{0.3}O_{3.0}$) and sulfides (such as $TiS_2$, $SnS_2$, $SnS$, $GeS_2$ and $GeS$); the current collector for negative electrode is prepared from stainless steel or copper and formed into a net, sheet, foil or lath shape; and the electrode mixtures used in combination with the positive and negative electrode-active materials or the negative electrode material may comprise a carbon material such as acetylene black or graphite or combination thereof as an electron-conductive agent.

Moreover, the binder used in preferred embodiments of the present invention may be fluorine atom-containing thermoplastic compounds such as poly(vinylidene fluoride) and polyfluoroethylene, acrylic acid moiety-containing polymers, styrene-butadiene rubber and elastomers such as ethylene-propylene terpolymers, which may be used alone or in combination, with poly(vinylidene fluoride) and acrylic acid-2-ethylhexyl acrylate copolymer being particularly preferred; the electrolyte solution comprises ethylene carbonate or a combination of ethylene carbonate with a cyclic or non-cyclic carbonate such as diethyl carbonate or dimethyl carbonate or an ester compound such as ethyl acetate; the supporting electrolyte preferably comprises a combination of $LiPF_6$ with a lithium salt such as $LiBF_4$ or $LiCF_3SO_3$; the separator preferably comprises polypropylene, polyethylene or combination thereof; and the assembled battery may have a coin, button, cylinder, flat or square shape. Moreover, the battery is preferably provided with a means for ensuring safety upon malfunction of the battery (such as an internal pressure-releasing type safety valve, a current-cutting off type safety valve or a separator whose resistance increases at a high temperature).

The non-aqueous secondary battery of the present invention is not limited to particular use and may be applied to electronic machinery and tools such as color note type personal computers, monochrome note type personal computers, subnote type personal computers, pen-input type personal computers, pocket (palm-top) personal computers, notebook type word processors, pocket word processors, electronic book-players, portable telephones, secondary telephones for cordless telephones, pagers, handy terminals, portable facsimile telegraphs, portable copying machines, portable printers, headphone stereo players, video movie-players, liquid crystal televisions, handy cleaners, portable CD-players, mini-disks, electric shavers, electronic translators, mobile telephones, transceivers, motor-driven tools, electronic notebooks, electronic calculators, memory cards, tape recorders, radios and back-up power sources; and daily necessaries such as motor cars, motor-driven cars, motors, lighting equipments, toys, machinery and tools for games, road conditioners, electric irons, watches, strobo lighting equipments, cameras and medical machinery and tools (such as pacemakers, hearing aids and kneaders). Moreover, the battery may likewise be used for a variety of munitional and space developmental machinery and tools. Furthermore, the battery of the present invention can be used in combination with other secondary batteries, solar batteries and/or primary batteries.

According to the present invention, there is provided a non-aqueous secondary battery which comprises a positive electrode-active material, a negative electrode material and a non-aqueous electrolyte wherein the electrode mixture for positive electrode includes a compound in which anions can be inserted (or which can be doped with anions) at a voltage of not less than 3.9 V (with respect to an $Li^+/Li$ electrode) such as carbonaceous compound obtained by firing a furan resin or a cresol resin. The non-aqueous secondary battery can ensure safety against any overcharge and has a high discharge voltage.

Moreover, according to a preferred embodiment of the present invention, there is provided a non-aqueous secondary battery which comprises a positive electrode-active material, a negative electrode material and a non-aqueous electrolyte wherein the electrode mixture for positive electrode includes at least one member selected from the group consisting of transition metals, elements of Group IIIB and IVB (except for carbon) and carbides thereof. The non-aqueous secondary battery permits increase in the charge capacity and discharge capacity without using any lithium compound reactive with, for instance, water and currently used in the non-aqueous secondary batteries. This leads to the reduction of the amount of the positive electrode-active material to be used and this in turn results in the improvement in the energy density of the resulting battery per unit volume. Moreover, the positive electrode-active material permits the use of water as a coating solvent and therefore, the present invention does not require the use of any particular and expensive installation as a means for handling the combustible solvent.

The present invention will hereinafter be described in more detail with reference to the following Examples, but the present invention is not limited to these specific Examples.

PREPARATION EXAMPLE 1

Synthesis of Carbonaceous Compound Obtained by Firing Furan Resin

Commercially available furfuryl alcohol (50 g), commercially available phosphoric acid (85%; 0.25 g) and distilled water (5 g) were admixed and reacted while maintaining the temperature of the mixture to 95° to 100° C. with stirring. After the reaction, the pH of the mixture was adjusted to 4 to 5 by the addition of 1N sodium hydroxide aqueous solution and the water was removed from the reaction system under reduced pressure. The resulting furan resin was fired at 500° C. for 2 hours and then 1100° C. for 3 hours in an argon atmosphere to give a furan resin-fired carbonaceous compound (yield 19 g). The carbonaceous compound was pulverized using a vibrating mill of tungsten carbide to give powder having an average particle size of 9.5 μm.

PREPARATION EXAMPLE 2

Synthesis of Carbonaceous Compound Obtained by Firing Cresol Resin

Commercially available orthocresol-novolak resin (50 g) was fired initially at 500° C. for 2 hours and then 1075° C. for 3 hours in an argon atmosphere to give a cresol resin-fired carbonaceous compound (yield 20 g). The carbonaceous compound was pulverized using a vibrating mill of tungsten carbide to give powder having an average particle size of 8.5 μm.

EXAMPLES 1 AND 2

The compounds of the present invention, i.e., the furan resin-fired carbonaceous compound and the cresol resin-fired carbonaceous compound were examined by the X-ray diffractometry to determine the value of the plane $d_{002}$ and the length $L_c$ of the crystallite. The results are listed in the following Table 1 together with the atomic ratio: hydrogen/carbon of these compounds.

EXAMPLES 3 to 12

A positive electrode pellet (13 mm Φ, 0.35 g) was prepared by mixing 90% by weight of a positive electrode-active material, 5% by weight of the furan resin-fired carbonaceous compound or the cresol resin-fired carbonaceous compound prepared in Preparation Example 1 or 2 and 1% by weight of acetylene black as conductivity-imparting agents, and 3% by weight (solid content) of an aqueous dispersion of poly(vinylidene fluoride) and 1% by weight of carboxymethyl cellulose as binders and then compression-molding the resulting electrode mixture for positive electrode. The pellet thus produced was sufficiently dehydrated using a far infrared heater in a dry box (dew point: −40° to −70° C.; dry air) and then put in practical use.

A negative electrode was prepared by mixing lithium-aluminum alloy (80:20 (weight ratio); 15 mm Φ, 0.6 mm thick) as a negative electrode material, 94% by weight of artificial graphite, 3% by weight of acetylene black as a conductivity-imparting agent and 3% by weight (solid content) of an aqueous dispersion of poly(vinylidene fluoride) as a binder to give an electrode mixture for negative electrode, followed by compression-molding the electrode mixture into a negative electrode pellet (13 mm Φ, 0.2 0 g) and sufficient dehydration of the pellet using a far infrared heater in a dry box identical to that used above. The resulting pellet was used as the negative electrode material. Moreover, other negative electrode pellets each was prepared by mixing 88% by weight of $LiCoVO_4$, SnO or $SnSiO_3$ as a negative electrode material, 6% by weight of flaky graphite and 3% by weight of acetylene black as conductivity-imparting agents, and 3% by weight (solid content) of an aqueous dispersion of poly(vinylidene fluoride) as a binder to give each corresponding electrode mixture for negative electrode, followed by compression-molding each electrode mixture into a negative electrode pellet (13 mm Φ, 0.047 g, 0.058 g or 0.056 g) and sufficient dehydration of each pellet using a far infrared heater in a dry box identical to that used above. The resulting pellets were used as the negative electrode materials.

As a current collector for both positive and negative electrode cans, a net of SUS316 having a thickness of 80 μm was used and it was connected to each coin-like can through welding. A 1 mole/l $LiPF_6$ solution (in 2:8 (volume ratio) ethylene carbonate/diethyl carbonate mixed solvent; 250 μl) was used as an electrolyte, and microporous polypropylene sheet and polypropylene nonwoven fabric which were impregnated with the electrolyte were used as separators. A coin-like lithium battery having a structure as shown in FIG. 1 was produced in a dry box identical to that used above.

Figure 1:
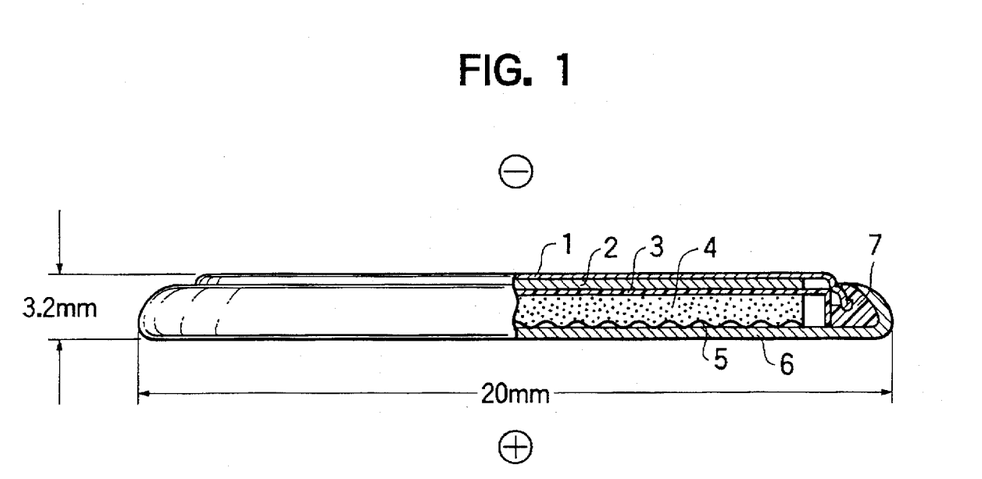
FIG. 1 is a cross sectional view of a coin-shaped non-aqueous secondary battery according to a preferred embodiment of the present invention and prepared in Examples.

In FIG. 1, a negative electrode pellet 2 of an electrode mixture therefor is sealed between a negative electrode sealing plate 1 and a separator 3, a positive electrode pellet 4 of an electrode mixture therefor is sealed between a positive electrode can 6 provided with a current collector 5 and the separator 3, and a gasket 7 is arranged between the outer edge of the negative electrode sealing plate 1 and the outer edge of the positive electrode can 6.

Each battery thus produced was subjected to two charge-discharge cycles at a current of 2 mA and a voltage ranging from 4.4 to 3.5 V, 4.1 to 3.0 V, 4.2 to 2.0 V, 4.2 to 2.8 V or 4.2 to 2.8 V for the negative electrode material Li-Al, graphite, LiCoVO$_4$, SnO or SnSiO$_3$, respectively. Moreover, each battery was charged at a constant current of 12.5 mA up to 10 V over 4 hours. Then the battery was charged at a constant voltage of 10 V. Thereafter, each battery was heated to raise the temperature thereof at a rate of 100° C./min. The averaged discharge voltage, the ultimate voltage by the overcharge, the severe reaction-occurring temperature and the battery resistance (1 kHz) after the overcharge observed during the 2nd cycle were determined. The results are listed in the following Table 2. The resistance (1 kHz) of each battery when it was subjected to the standard charging procedure was found to be 10 to 13 Ω in all the cases examined.

COMPARATIVE EXAMPLES 1 to 4

The value of the plane d$_{002}$ and the length L$_c$ of the crystallite of compounds outside the scope of the present invention, i.e., acetylene black, artificial graphite, naturally occurring graphite and petroleum coke are listed in Table 1.

COMPARATIVE EXAMPLES 5 to 6

A battery was prepared by repeating the same procedures used in Example 4 or 8 except that acetylene black or artificial graphite was substituted for the furan resin-fired carbonaceous compound or the cresol resin-fired carbonaceous compound and the same test used in Example 4 or 8 was carried out using each resulting battery. The result thus obtained are summarized in the following Table 2.

COMPARATIVE EXAMPLES 7 to 11

The same procedures used in Examples 3 to 7 were repeated except that acetylene black was substituted for the furan resin-fired carbonaceous compound to give batteries, the resulting batteries were subjected to two charge-discharge cycles, without being overcharged, under the standard charging and discharging conditions and then heated at a rate of 100° C./min. The results are summarized in the following Table 3.

TABLE 1

| Ex. No. | Conductivity-Imparting Agent | d$_{002}$ | L$_c$ | H/C |
| --- | --- | --- | --- | --- |
| 1 | Furan Resin | 3.68 | 12.5 | 0.015 |
| 2 | Cresol Resin | 3.70 | 13.4 | 0.014 |
| 1* | Acetylene Black | 3.48 | 59.6 | 0.001 |
| 2* | Artificial Graphite | 3.37 | 266.8 | 0.0001 |
| 3* | Naturally Occuring Graphite | 3.37 | 242.0 | 0.0001 |
| 4* | Petroleum Coke | 3.45 | 180.0 | 0.004 |

*: Comparative Example

TABLE 2

| Ex. No. | a | b | c | d | e | f(°C.) | g(Ω) |
| --- | --- | --- | --- | --- | --- | --- | --- |
| 3 | LiCoO$_2$ | Li—Al | furan resin | 4.0 V | 10 V | 213 | 300 |
| 4 | LiCoO$_2$ | graphite | furan resin | 3.7 | 10 | 225 | 290 |
| 5 | LiCoO$_2$ | LiCoVO$_4$ | furan resin | 2.9 | 10 | 220 | 310 |
| 6 | LiCoO$_2$ | SnO | furan resin | 3.5 | 10 | 223 | 300 |
| 7 | LiCoO$_2$ | SnSiO$_3$ | furan resin | 3.5 | 10 | 230 | 310 |
| 8 | LiCoO$_2$ | Li—Al | cresol resin | 4.0 | 10 | 198 | 350 |
| 9 | LiCoO$_2$ | graphite | cresol resin | 3.7 | 10 | 218 | 330 |
| 10 | LiCoO$_2$ | LiCoVO$_4$ | cresol resin | 2.9 | 10 | 215 | 320 |
| 11 | LiCoO$_2$ | SnO | cresol resin | 3.5 | 10 | 217 | 340 |
| 12 | LiCoO$_2$ | SnSiO$_3$ | cresol resin | 3.5 | 10 | 220 | 350 |
| 5* | LiCoO$_2$ | Li—Al | acetylene black | 4.0 | 4.9 | 112 | 20 |
| 6* | LiCoO$_2$ | Li—Al | artificial graphite | 4.0 | 4.8 | 123 | 24 |

*: Comparative Example
a: Positive electrode-active material.
b: Negative electrode material.
c: Conductivity-imparting agent.
d: Charge capacity observed during 2nd charge-discharge cycle.
e: Ultimate voltage by overcharge.
f: Severe reaction-occurring temperature.
g: Resistance (1 kHz) of each battery after overcharge.

TABLE 3

| Comp. Ex. No. | a | b | c | d (V) | e | f (°C.) |
| --- | --- | --- | --- | --- | --- | --- |
| 7 | LiCoO$_2$ | Li—Al | acetylene black | 4.0 | — | 235 |
| 8 | LiCoO$_2$ | graphite | acetylene black | 3.7 | — | 240 |
| 9 | LiCoO$_2$ | LiCoVO$_4$ | acetylene black | 2.9 | — | 237 |
| 10 | LiCoO$_2$ | SnO | acetylene black | 3.5 | — | 237 |
| 11 | LiCoO$_2$ | SnSiO$_3$ | acetylene black | 3.5 | — | 240 |

Note: "a" to "f" are the same as those defined in Table 2.

When the batteries produced in Examples 3 to 12, in which the compounds of the present invention were used, were continuously charged, the voltage thereof continued to increase, reached 10 V after about 2 hours and then the current value was gradually reduced during the constant voltage condition. On the other hand, when the batteries produced in Comparative Examples 5 and 6 which were free of the compounds of the present invention were continuously charged, it was observed that the voltage stayed at a level ranging from 4.8 to 4.9 V. This indicates that the overcharge continued to further proceed. Moreover, the data shown in Tables indicate that the batteries comprising the compounds of the present invention had severe reaction-occurring temperatures higher than those observed for the batteries free of such compounds. In addition, the severe reaction-occurring temperatures are almost identical to those observed for the batteries which were not subjected to overcharge and this indicates that the batteries of the present invention did not arrive at the overcharged states. The batteries comprising the compounds of the present invention, i.e., those produced in Examples 3 to 12 were lightly broken due to heating after the overcharge, while the batteries produced in Comparative Examples 5 and 6 were severely broken. Moreover, when the charging was terminated at a voltage of 5.5 V, the reduction of the voltage of the batteries comprising the compounds of the present invention increased. This clearly indicates that the resistance of these batteries increases when they are overcharged. In addition, the degree of the anion doping after the overcharge was such that all of the values d$_{002}$ observed for the conductivity-imparting agents used in Examples 3 to 12 increased by about 0.7 Å, while the increase in the values $d_{002}$ observed for the conductivity-imparting agents used in Comparative Examples 5 and 6 fell within the range of the measurement error. The same results discussed above were likewise observed for the cylindrical batteries and those in which $LiNiO_2$ was used as the positive electrode-active material.

The ionic radii of $Si^{+4}$, $B^{+3}$, $Ti^{+4}$, $Mo^{+6}$, $W^{+6}$, $Zn^{+2}$ and $Ag^{+1}$ are listed in the following Table 4.

TABLE 4

| Ion | Ionic Radius (Å) |
| --- | --- |
| $Si^{+4}$ | 0.40 |
| $B^{+3}$ | 0.16 |
| $Ti^{+4}$ | 0.75 |
| $Mo^{+6}$ | 0.56 |
| $W^{+6}$ | 0.55 |
| $Zn^{+2}$ | 0.74 |
| $Ag^{+1}$ | 1.16 |

EXAMPLES 13 to 36

There were mixed 93% by weight of a positive electrode-active material, 3% by weight of acetylene black as a conductivity-imparting agent and 3% by weight (solid content) of an aqueous dispersion of poly(vinylidene fluoride) and 1% by weight of carboxymethyl cellulose as binders to give an electrode mixture for positive electrode, followed by mixing the electrode mixture, in a powdery state, with 0.5 or 1% by weight of Si, B, $B_4C$, TiC, $Mo_2C$, $W_2C$, Zn or Ag, compression-molding the resulting powder mixture into each positive electrode pellet (13 mm Φ; 0.10 g), sufficient dehydration of the pellet using a far infrared heater in a dry box identical to that used above. Each resulting pellet was used as the positive electrode pellet.

On the other hand, a negative electrode pellet was prepared by mixing 94% by weight of artificial graphite as a negative electrode material, 3% by weight of acetylene black as a conductivity-imparting agent and 3% by weight (solid content) of an aqueous dispersion of poly(vinylidene fluoride) as a binder to give an electrode mixture for negative electrode, followed by compression-molding the electrode mixture into a negative electrode pellet (13 mm Φ; 0.06 g), then sufficient dehydration of the pellet using a far infrared heater in a dry box identical to that used above. The resulting pellet was used as the negative electrode pellet. Separately, other negative electrode materials each was prepared by mixing 88% by weight of a negative electrode material other than artificial graphite, i.e., $LiCoVO_4$, SnO, $SnSiO_3$ or $Sn_{0.8}Si_{0.5}Al_{0.1}B_{0.2}P_{0.3}O_{3.0}$, 6% by weight of artificial graphite and 3% by weight of acetylene black as conductivity-imparting agents and 3% by weight (solid content) of an aqueous dispersion of poly(vinylidene fluoride) as a binder to give each corresponding electrode mixture for negative electrode, followed by compression-molding each electrode mixture into a negative electrode pellet (13 mm Φ; 0.06 g, respectively), then sufficient dehydration of the pellet using a far infrared heater in a dry box identical to that used above. Each resulting pellet was used as the negative electrode material.

As a current collector for both positive and negative electrode cans, a net of SUS316 having a thickness of 80 μm was used and it was connected to each coin-like can through welding. A 1 mole/l $LiPF_6$ solution (in 2:8 (volume ratio) ethylene carbonate/diethyl carbonate mixed solvent; 200 μl) was used as an electrolyte, and microporous polypropylene sheet and polypropylene nonwoven fabric which were impregnated with the electrolyte were used as separators. A coin-like lithium battery having a structure as shown in FIG. 1 was produced in a dry box identical to that used above.

Each battery thus produced was subjected to charging, for 10 hours, at a constant current of 2 mA and at a voltage ranging from 4.1 to 3.0 V, 4.1 to 2.0 V, 4.1 to 2.8 V, 4.1 to 2.8 V or 4.1 to 2.8 V for the negative electrode material $LiCoVO_4$, SnO, $SnSiO_3$ or $Sn_{0.8}Si_{0.5}Al_{0.1}B_{0.2}P_{0.3}O_{3.0}$, respectively and then discharged at a constant current of 2 mA. The charging capacity (relative to that observed for the battery wherein $LiCoO_2$ was substituted for the compound of the present invention, whose charging capacity was defined to be 100) and the discharge capacity (likewise relative value) during the 1st cycle observed for each battery were determined. The results are listed in the following Table 5.

Moreover, the averaged discharge voltages of the batteries which comprised the compounds of the present invention were identical to those observed for the batteries free of the compounds of the present invention (the results are not shown in the following Table 5). More specifically, the batteries of the present invention showed a high averaged discharge voltage ranging from 3.5 to 3.7 V depending on the negative electrode materials used. Moreover, it was found that the same results were observed when $LiNiO_2$, $LiNi_{0.9}Co_{0.1}O_2$ and $LiMn_2O_4$ were used as the positive electrode-active materials.

TABLE 5

| Ex. No. | Negative Electrode Material | Compound | Added Amount | Charge Capacity | Discharge Capacity |
| --- | --- | --- | --- | --- | --- |
| 13 | graphite | Si | 1 (wt %) | 111 | 114 |
| 14 | $LiCoVO_4$ | Si | 1 | 112 | 118 |
| 15 | SnO | Si | 1 | 113 | 119 |
| 16 | $SnSiO_3$ | Si | 1 | 114 | 120 |
| 17 | graphite | B | 1 | 118 | 121 |
| 18 | $LiCoVO_4$ | B | 1 | 119 | 126 |
| 19 | SnO | B | 1 | 120 | 125 |
| 20 | $SnSiO_3$ | B | 1 | 120 | 127 |
| 21 | $SnSiO_3$ | $B_4C$ | 1 | 110 | 118 |
| 22 | $SnSiO_3$ | TiC | 1 | 105 | 110 |
| 23 | $SnSiO_3$ | $Mo_2C$ | 1 | 107 | 111 |
| 24 | $SnSiO_3$ | $W_2C$ | 1 | 103 | 105 |
| 25 | $SnSiO_3$ | Zn | 1 | 103 | 104 |
| 26 | $SnSiO_3$ | Ag | 1 | 101 | 101 |
| 27 | $Sn_{0.8}Si_{0.5}Al_{0.1}B_{0.2}P_{0.3}O_{3.0}$ | Si | 0.5 | 110 | 113 |
| 28 | $Sn_{0.8}Si_{0.5}Al_{0.1}B_{0.2}P_{0.3}O_{3.0}$ | Si | 1 | 115 | 121 |
| 29 | $Sn_{0.8}Si_{0.5}Al_{0.1}B_{0.2}P_{0.3}O_{3.0}$ | B | 0.5 | 112 | 116 |
| 30 | $Sn_{0.8}Si_{0.5}Al_{0.1}B_{0.2}P_{0.3}O_{3.0}$ | B | 1 | 121 | 128 |
| 31 | $Sn_{0.8}Si_{0.5}Al_{0.1}B_{0.2}P_{0.3}O_{3.0}$ | $B_4C$ | 1 | 111 | 119 |
| 32 | $Sn_{0.8}Si_{0.5}Al_{0.1}B_{0.2}P_{0.3}O_{3.0}$ | TiC | 1 | 106 | 111 |
| 33 | $Sn_{0.8}Si_{0.5}Al_{0.1}B_{0.2}P_{0.3}O_{3.0}$ | $Mo_2C$ | 1 | 108 | 112 |
| 34 | $Sn_{0.8}Si_{0.5}Al_{0.1}B_{0.2}P_{0.3}O_{3.0}$ | $W_2C$ | 1 | 104 | 107 |
| 35 | $Sn_{0.8}Si_{0.5}Al_{0.1}B_{0.2}P_{0.3}O_{3.0}$ | Zn | 1 | 104 | 105 |
| 36 | $Sn_{0.8}Si_{0.5}Al_{0.1}B_{0.2}P_{0.3}O_{3.0}$ | Ag | 1 | 101 | 103 |

What is claimed is:

1. A non-aqueous secondary battery which comprises a positive electrode-active material, a negative electrode material and a non-aqueous electrolyte, wherein an electrode mixture for positive electrode containing the positive electrode-active material comprises a compound in which anions can be inserted at a voltage of not less than 3.9 V with respect to an $L^+/Li$ electrode.

2. The non-aqueous secondary battery of claim 1 wherein the anions are inserted into the compound to increase the internal resistance of the battery.

3. The non-aqueous secondary battery of claim 1 wherein the compound in which anions can be inserted is a carbonaceous compound.

4. The non-aqueous secondary battery of claim 3 wherein the carbonaceous compound is obtained by firing an aromatic condensation polymer compound.

5. The non-aqueous secondary battery of claim 1 wherein the compound in which anions can be inserted has a crystallite size $L_c$ of not more than 50 Å as determined by X-ray diffractometry.

6. The non-aqueous secondary battery of claim 1 wherein the compound in which anions can be inserted has an atomic ratio: hydrogen/carbon of not more than 0.04.

7. The non-aqueous secondary battery of claim 1 wherein the compound in which anions can be inserted is used in combination with acetylene black.

8. The non-aqueous secondary battery of claim 1 wherein the compound in which anions can be inserted is contained in an amount ranging from 0.1 to 10% by weight based on the weight of the electrode mixture.

9. The non-aqueous secondary battery of claim 1 wherein the anion comprises at least $PF_6^-$.

10. The non-aqueous secondary battery of claim 1 wherein the non-aqueous electrolyte comprises at least one non-cyclic carbonate as a solvent.

11. The non-aqueous secondary battery of claim 1 wherein the electrode mixture for positive electrode comprises at least one member selected from the group consisting of transition metals, elements belonging to Group IIIB and IVB of the Periodic Table except for C and carbides thereof.

12. The non-aqueous secondary battery of claim 11 wherein the transition metals and elements of Group IIIB and IVB except for C each has an ionic radius ranging from 0.1 to 1.0 Å.

13. The non-aqueous secondary battery of claim 11 wherein the electrode mixture for positive electrode comprises the transition metal, the element of Group IIIB and IVB except for C or the carbide thereof in an amount ranging from 0.01 to 10% by weight based on the weight of the electrode mixture.

14. The non-aqueous secondary battery of claim 11 wherein the transition metal, the element of Group IIIB and IVB except for C or the carbide thereof is selected from the group consisting of B, Si, $B_4C$ and $Mo_2C$.

15. The non-aqueous secondary battery of claim 7 wherein a supporting salt of the electrolyte comprises at least $PF_6^-$.

16. The non-aqueous secondary battery of claim 1 wherein the positive electrode-active material has a cut off voltage for charging at a voltage of not less than 3.9 V with respect to an $Li^+/Li$ electrode.

17. The non-aqueous secondary battery of claim 1 wherein the positive electrode-active material comprises a compound represented by $Li_xMO_2$, wherein M is at least one member selected from the group consisting of Co, Ni, Mn and Fe; $0.05 \leq x \leq 1.2$ and/or a compound mainly comprising a spinel structure comprising at least one member selected from the group consisting of Co, Ni, Mn, Fe and V.

18. The non-aqueous secondary battery of claim 1 wherein the negative electrode material comprises a compound which can absorb and release lithium.

19. A non-aqueous secondary battery which comprises a positive electrode-active material, a negative electrode material and a non-aqueous electrolyte, wherein an electrode mixture for positive electrode containing the positive electrode-active material comprises a compound in which anions can be inserted at a voltage of not less than 3.9 V with respect to an $Li^+/Li$ electrode; and wherein the compound in which anions can be inserted is a carbonaceous compound and said carbonaceous compound is obtained by firing at least one of a furan or cresol resin.

20. A non-aqueous secondary battery which comprises a positive electrode-active material, a negative electrode material and a non-aqueous electrolyte, wherein an electrode mixture for positive electrode containing the positive electrode-active material comprises a compound in which anions can be inserted at a voltage of not less than 3.9 V with respect to an $Li^+/Li$ electrode; and wherein the compound in which anions can be inserted has a distance, $d_{002}$, between 002 planes of not less than 3.5 Å.

21. A non-aqueous secondary battery which comprises a positive electrode-active material, a negative electrode material and a non-aqueous electrolyte, wherein an electrode mixture for positive electrode containing the positive electrode-active material comprises a conductive polymer compound having a resonance structure or a carbonaceous compound in which anions can be inserted at a voltage of not less than 3.9 V with respect to an $Li^+/Li$ electrode.

22. The non-aqueous secondary battery of claim 21, wherein the anions are included in an electrolyte solution.

23. The non-aqueous secondary battery of claim 21, wherein the anions are inserted into the compound to increase the internal resistance of the battery.

* * * * *